J. E. KEY.
LATHE.
APPLICATION FILED JUNE 6, 1906.

967,201.

Patented Aug. 16, 1910.

J. E. KEY.
LATHE.
APPLICATION FILED JUNE 6, 1906.

967,201.

Patented Aug. 16, 1910.
3 SHEETS—SHEET 2.

WITNESSES
Harry L. Lechner
J. C. Bradley

INVENTOR
James E. Key
by atty
Paul Synnestvedt

J. E. KEY.
LATHE.
APPLICATION FILED JUNE 6, 1906.

967,201.

Patented Aug. 16, 1910.

WITNESSES

INVENTOR
James E. Key

UNITED STATES PATENT OFFICE.

JAMES E. KEY, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA.

LATHE.

967,201. Specification of Letters Patent. Patented Aug. 16, 1910.

Original application filed November 13, 1905, Serial No. 287,019. Divided and this application filed June 6, 1906. Serial No. 320,390.

*To all whom it may concern:*

Be it known that I, JAMES E. KEY, a citizen of the United States, residing at Wilmerding, in the county of Allegheny and State of Pennsylvania, have invented certain new and useful Improvements in Lathes, of which the following is a specification.

The invention relates to lathes and has for its objects; to provide a tool carriage adapted to support the work during the relative movement of the carriage and the work; to provide a tool carriage having a work support adapted to effectively steady the work adjacent the tool; to provide a tool carriage provided with a work support adapted to receive the end of the finished work and center it; and finally to provide a lathe which is especially adapted for accurate work and which may be conveniently and rapidly operated. These and other objects and advantages are accomplished by my invention, one form of which is illustrated in the accompanying drawings in which—

Figure 1:
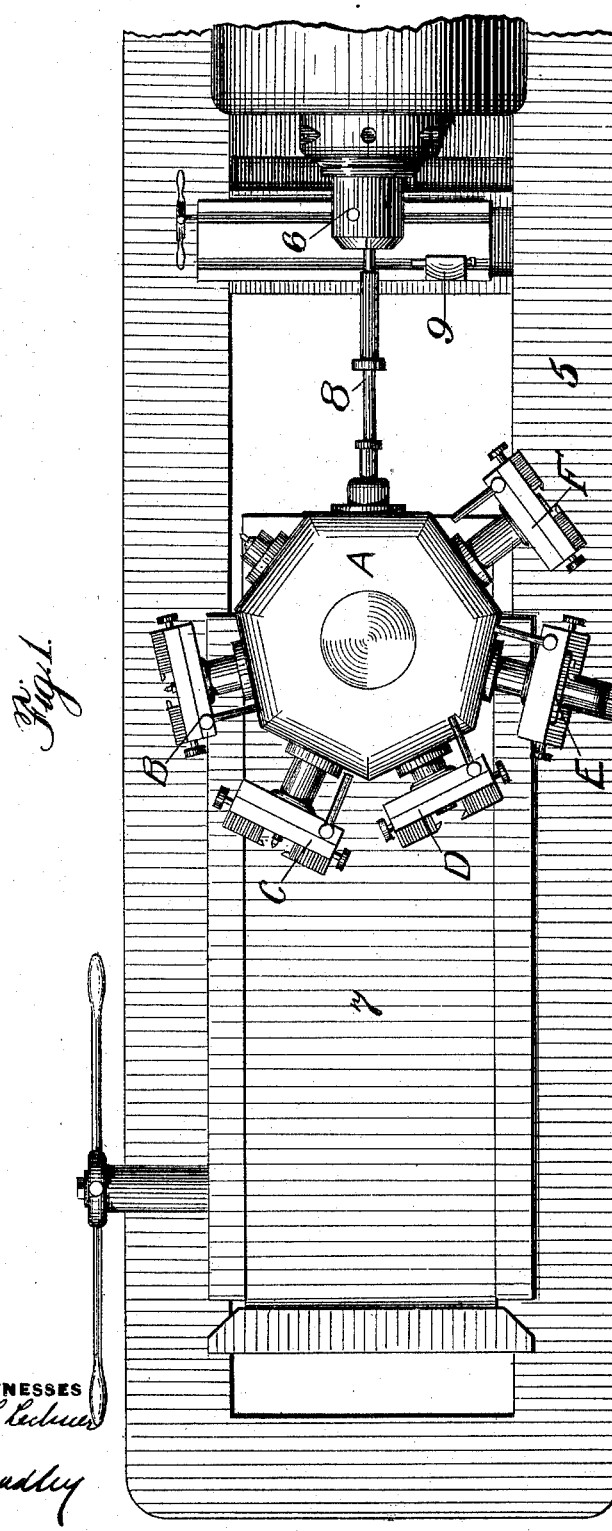
Figure 1 is a plan view of the turret lathe embodying my invention.
Figure 2:
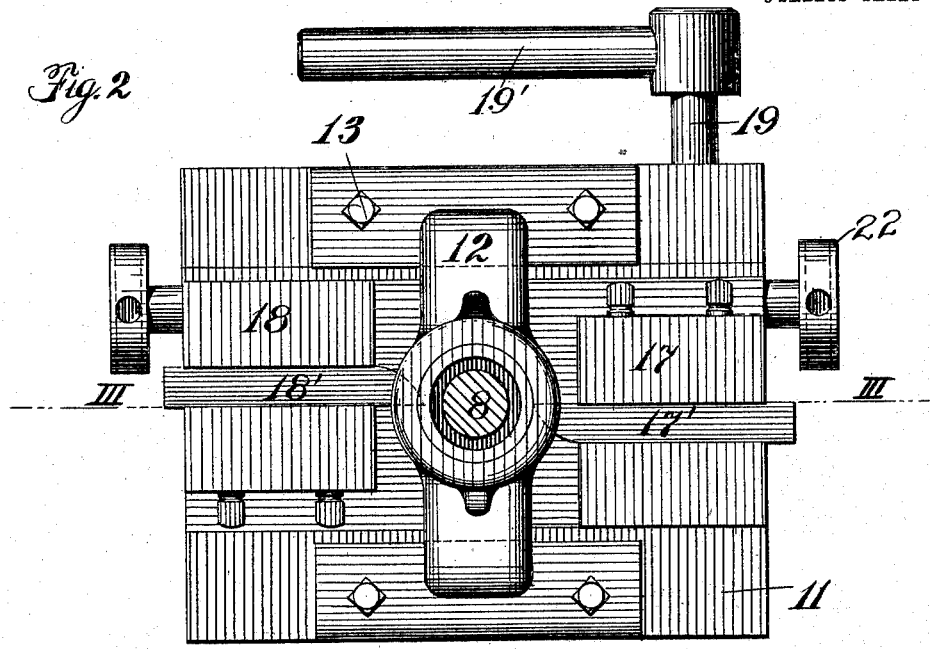
Figure 2 is a front view of the work support and tool carriage.

The invention is intended primarily to be used in a turret lathe such as that shown in the plan view in Figure 1, which lathe forms the subject matter of my copending application Serial Number 287,019, of which the present case is a division. As shown in this figure the rotary turret A is provided with a plurality of operating means B, C, D, E, and F, around its periphery, which means are adapted to be brought into position to operate successively on the work which is held in the tool chuck, and my invention relates particularly to the construction of the operating means D, E, and F, which means are shown in detail in Figures 2, 3, 4, 5, and 6.

Figure 5:
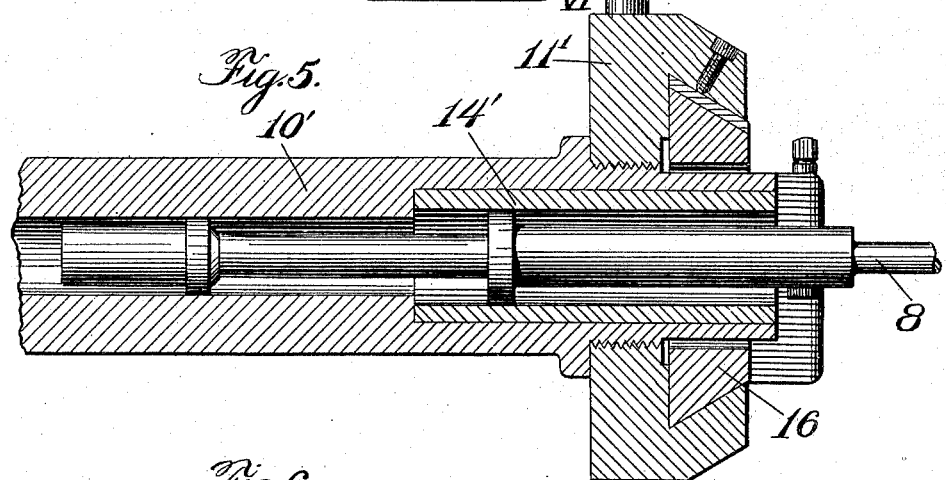
Figure 5 is a central longitudinal section through a modified form of device.
Figure 6:
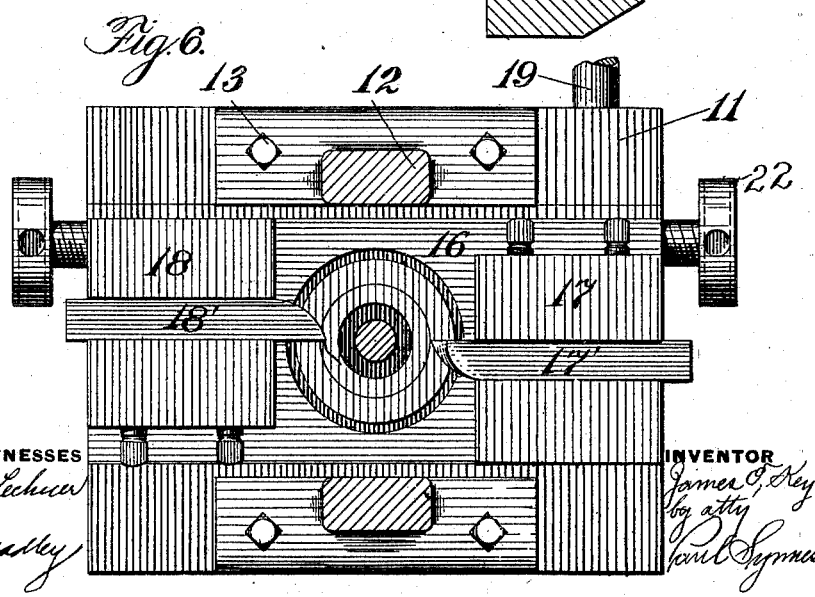
Figure 6 is a transverse section through the device of Figure 4 on the line VI—VI.

Describing the construction more in detail in referring to Figure 1, 5 is the bed of the machine, which may be of any preferred form, 6 is the chuck which is adapted to hold the work securely, A is the turret mounted upon the carriage 7 which parts A and 7 constitute what may be termed the carriage of the device, and 8 is the work which in the present case is a valve rod for a triple valve, and 9 is the transversely movable tool for cutting the shoulders upon the work. The operating means E is shown in detail in Figures 2, 3, 4, and 6 and the means D and F which are only slightly different from the means E in construction are shown in cross section in Figure 5. The three means D, E, and F which are all intended to operate upon the work intermediate its ends and reduce the same to different diameters include a cutting means mounted upon the carriage together with a supporting means for the work whereby it is slidably supported to provide for the feed of the carriage over the work and to hold the such work steady during the cutting operation. The operating means B and C which prepare the rod for the operations to be undergone in the means D, E, and F is a separate invention constituting the subject matter of another application Serial Number 320,389 which is also a division of the primary application Serial Number 287,019. The means B and C reduce the end of the rod 8 to the proper size for engagement in the cylindrical supporting recesses in the members D, E, and F to be hereinafter described.

Figure 3:
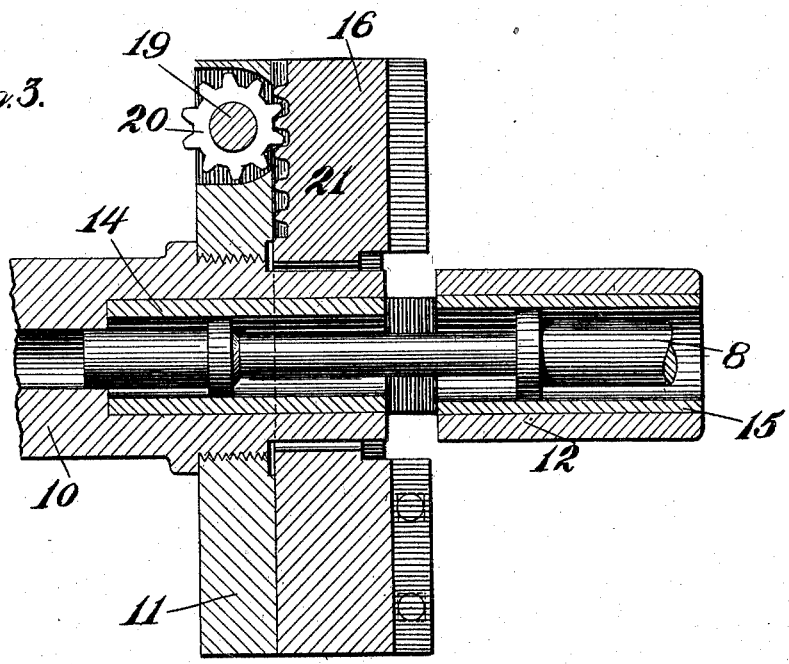
Figure 3 is a transverse section through the device on the line III—III of Figure 2.
Figure 4:
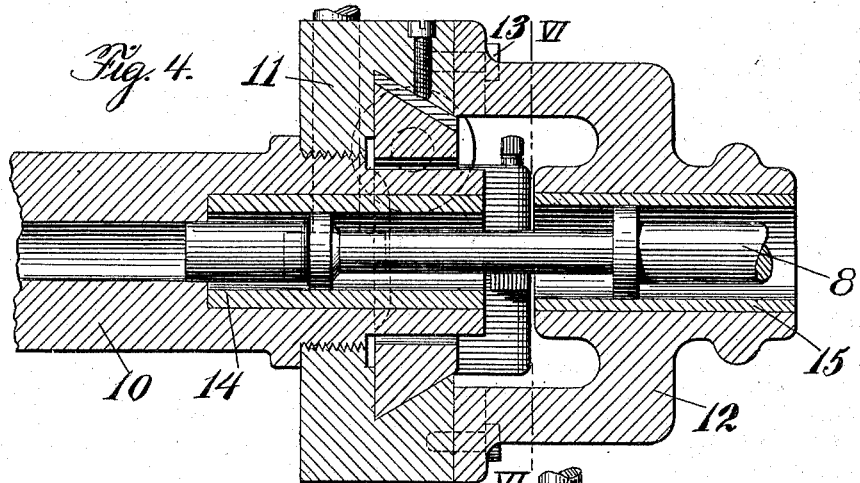
Figure 4 is a central longitudinal section through the device of Figure 2.

Describing the construction of Figures 2, 3, 4, 5, and 6, more in detail, 10 is the supporting sleeve projecting from the turret A, 11 is the block upon the end of such sleeve 10, 12 is the supplemental supporting member secured removably to the end of the block 11 by means of the bolts, 13; 14, and 15 are bushings of proper size to receive and support the work, 16 is the slide member for the tool blocks carrying at either end the blocks 17 and 18 for the roughing and finishing tools 17′ and 18′ respectively, 19 is the operating shaft provided with a handle 19′ for shifting the finishing and roughing tools into cutting position in alternation, and 22 are a pair of stop screws carried by the slide member 16, the heads of which screws take against the block 11 when the slide member reaches its extreme positions. As shown in Figure 3 the end of the shaft 19 carries a spur wheel 20 meshing with a rack 21 connected to the slide member 16. By turning the handle 19' the two tools may be brought alternately into a position for work or may be carried to an intermediate position wherein neither of them engages the work. As shown more clearly in Figure 2 the supplemental work support 12 is in the form of a yoke which projects out from the front of the block 11. It will be seen that when the work 8 is in the position shown in Figure 4 the bushings 14 and 15 support the rod on both sides of the cutting tools thereby preventing any movement of the work and providing for an accurate cut.

The members D and F previously referred to are substantially the same in construction and are shown in cross section in Figure 5. With the exception of the fact that these members are not provided with the supplemental work support 12 the construction and operation of these devices is substantially the same as that of the device E heretofore described and shown in Figure 5. The tools are supported and operated in the same way upon the block 11' and the finished work is supported on the inside of the sleeve 10' by means of the bushing 14'. The various bushings 14, 15, and 14' may be changed to suit any size of work and by using the proper size of bushings a very accurate fit of the finished work herein may be secured.

It will be seen from the foregoing that the work is securely centered and supported and by changing the size of the bushing any desired size of rod may be operated upon. It will also be apparent that by mounting the tool and the work support upon the same structure a very uniform cut will result for the reason that any movements of the tool tending to make an irregular cut will also be transferred to the work support and unevenness in the product will be avoided.

Having thus described my invention and illustrated its use, what I claim as new and desire to secure by Letters Patent, is the following:

1. In combination, a supporting block, a tool slide having a transverse opening mounted for transverse movement thereon, and a spindle on which the block is mounted provided with a sleeve portion extending through the opening in the slide and forward to a point adjacent the tool and adapted to receive and support the work and means for reciprocating the tool slide.

2. The combination with a supporting spindle provided with a forwardly projecting sleeve having a longitudinal opening for receiving and centering the work, of a block on the spindle having a transversely movable cutter mounted thereon, and a yoke projecting from the front of the block and secured detachably thereto and having a supporting sleeve extending to a position adjacent the cutting tool.

In testimony whereof I have hereunto signed my name in the presence of the two subscribed witnesses.

JAMES E. KEY.

Witnesses:
EDMUND SIMPSON,
F. E. GAITHER.